(12) United States Patent
Ekevad

(10) Patent No.: US 10,173,338 B2
(45) Date of Patent: Jan. 8, 2019

(54) CURVE CUTTING WITH A CIRCULAR SAW BLADE

(71) Applicant: SÖDERHAMN ERIKSSON AB, Söderhamn (SE)

(72) Inventor: Mats Ekevad, Skellefteå (SE)

(73) Assignee: Soderhamm Eriksson AB, Soderhamn (SE)

( * ) Notice: Subject to any disclaimer, the term of this patent is extended or adjusted under 35 U.S.C. 154(b) by 237 days.

(21) Appl. No.: 14/910,556

(22) PCT Filed: Jul. 7, 2014

(86) PCT No.: PCT/SE2014/050870
§ 371 (c)(1),
(2) Date: Feb. 5, 2016

(87) PCT Pub. No.: WO2015/020593
PCT Pub. Date: Feb. 12, 2015

(65) Prior Publication Data
US 2016/0176063 A1    Jun. 23, 2016

(30) Foreign Application Priority Data
Aug. 7, 2013   (SE) ...................................... 1350936

(51) Int. Cl.
*B27B 7/00*    (2006.01)
*B27B 1/00*    (2006.01)
(Continued)

(52) U.S. Cl.
CPC ............ *B27B 1/007* (2013.01); *B23D 59/008* (2013.01); *B26D 5/005* (2013.01); *B27B 7/00* (2013.01); *G05B 15/02* (2013.01)

(58) Field of Classification Search
None
See application file for complete search history.

(56) References Cited

U.S. PATENT DOCUMENTS 4,548,247 A    10/1985    Eklund
4,690,188 A    9/1987    Hasenwinkle
(Continued)

FOREIGN PATENT DOCUMENTS

| CA | 2338242 | 8/2001 |
| WO | WO 02/34485 A1 | 5/2002 |
| WO | WO 2014/131823 A1 | 9/2014 |

OTHER PUBLICATIONS

Canadian Patent Application No. 2,920,640; Examination Report; dated Nov. 18, 2016.
(Continued)

*Primary Examiner* — Bradley K Smith
(74) *Attorney, Agent, or Firm* — Schwabe Williamson & Wyatt, P.C.

(57) ABSTRACT

Method (500) and calculating unit (620) for curve sawing of a block (100) in a cutting direction (S) with at least a first circular saw blade (110). The method (500) comprises determining (501) a radius (R) of the curve sawing, by measuring the curvature of the block (100) in the direction of cutting (S); calculating (502) a vertical inclination angle (β) of the first circular saw blade (110) in a vertical plane (V) relative to the cutting direction (S) in the block (100), based on the determined radius (R) of the curve sawing; inclining (503) the first circular saw blade (110) with the calculated (502) vertical inclination angle (β); and sawing (508) the block (100) in the cutting direction (S) with the inclined (503) first circular saw blade (110) along the determined (501) radius (R) of the curve sawing.

19 Claims, 6 Drawing Sheets

(51) Int. Cl.
*B26D 5/00* (2006.01)
*G05B 15/02* (2006.01)
*B23D 59/00* (2006.01)

(56) References Cited

U.S. PATENT DOCUMENTS

| | | | |
|---|---|---|---|
| 4,881,584 A | | 11/1989 | Wislocker |
| 5,816,302 A | | 10/1998 | Newnes |
| 5,884,682 A | * | 3/1999 | Kennedy .............. B27B 1/007 144/242.1 |
| 6,178,858 B1 | * | 1/2001 | Knerr .................... B27B 1/007 144/3.1 |
| 6,202,526 B1 | * | 3/2001 | Dockter ................ B27B 1/007 83/368 |
| 6,612,216 B2 | * | 9/2003 | McGehee .............. B27B 5/36 83/425.4 |
| 7,108,030 B1 | | 9/2006 | Smith |

OTHER PUBLICATIONS

Canadian Patent Application No. 2,920,640; Examination Report dated Apr. 3, 2017.
European Patent Application No. 14834988.9; European Search Report dated Feb. 13, 2017.
PCT Application No. PCT/SE2014/050780; Int'l Search Report and Written Opinion dated Nov. 10, 2014.
Australian Patent Application No. 2014305201; Examination Report dated Apr. 13, 2017.
Australian Patent Application No. 2014305201; Examination Report dated Sep. 28, 2017.

* cited by examiner

CURVE CUTTING WITH A CIRCULAR SAW BLADE

TECHNICAL FIELD

The invention relates to a method and a calculation unit. More specifically, the invention relates to curve sawing of a block utilising at least one circular saw blade.

BACKGROUND

A common way to decompose logs into boards and planks is that in a first stage in a so-called stock-taking saw, cut a rectangular block by cutting off the sides, called back sides of the log. The block that remains to divide in a second step in a second-coming so-called division saw has a rectangular cross section, but is usually more or less curved in the longitudinal direction, depending on the log curve. Curve sawing is therefore a usual manner by sawing recut to decompose the curved block and thus gain advantages as to quality and increased yield, as a result of following the grain of the wood to a greater extent compared to straight sawing. It may be added that curve sawed boards later straightens out when drying.

Curve sawing comprises feeding the curved block past the division saw in a curved path that follows the log's curvature. In some cases, a different curve radii when curve sawing along a log. This is due to a rootstock often is crooked in the root end, but may be straightened in the top end. The division saw may be a single circular saw blade (single blade) or double circular saw blades (double blades or twin blades).

When sawing recut with double blades, or twin blades, these often are conflicting and displaced in the feed direction to permit vertical overlap between the circular saws and a certain safety margin to prevent the saw blades from coming into contact with each other. In some cases the overlying and the underlying saw blade may be parallel to each other in a vertical plane, i.e. lack displacement in the feeding direction in relation to each other. In such case, the rotation of the saw blades may be synchronised with each other so that the saw teeth on each respective the saw blade engage in the gap between the serrations on the opposite saw blade, much like the teethes of a pair of inter acting gears, but without touching each other.

A problem occurring at such tight curve sawing is that the saw cuts into the log becomes oblique and curved due to undesirable geometry. The magnitude of this so-called decomposition error may be 0.2-0.6 mm for the relatively large radius curves that are used today, approximately 40-60 meters. For double blades the situation becomes even worse by saw cuts are broadened and rear-sawing is done. Rear-sawing means that the blade of the circular saw blade's rear part (in the log feed direction) will engage as a result of unwanted side forces that push on the blade, resulting in a wider kerf, or saw cut, in the block than otherwise. This increases chip loss, resulting in a reduced yield.

Furthermore, due to the undesirable side forces that occur on the saw blade, it must be dimensioned to withstand this stress laterally, i.e. to be thicker than otherwise would be necessary. This however increases kerf loss further. In addition, there is also an increased risk of blade deformation or breakage and/or that the saw blade must be replaced more frequently than otherwise which can be costly, not least as the production has to be stopped when the saw is at a standstill due to maintenance.

It may also emerge an increased need to insert a wiper slot in the saw blade, which generates further sawdust and thus lowers the yield further.

A further problem with curve sawing is that the timber often has a stronger curvature than the minimum bending radius possible to comply with a circular saw, resulting in that the grain cannot be followed. Another problem is that the wood may be bent in different directions. In such case, it may not be possible to curve saw the wood so that the grain followed.

It may be concluded that there is a need for improvement to increase yield and reduce kerf loss associated with curve sawing of timber, as well as to increase the quality of sawn timber, especially as economical margins may be strained in the sawmill industry.

SUMMARY

It is therefore an object of this invention to avoid at least some of the above listed disadvantages and allow an improved procedure for curve sawing of wood.

According to a first aspect of the invention, this objective is achieved by a method for curve sawing of a block in a cutting direction with at least one first circular saw blade. The method comprises determining the radius of the curve sawing, by measuring the curvature of the block in the direction of cutting. The method also comprises calculating a vertical inclination angle of the first circular saw blade in a vertical plane relative to the direction of cutting in the block, based on the determined radius of the curve sawing. Furthermore, the method also comprises inclining or screwing the first circular saw blade with the calculated vertical inclination angle. The method also comprises sawing of the block in the direction of cutting of the inclined first circular saw blade along the determined radius of the curve sawing.

According to a second aspect of the invention, this objective is achieved by a calculating unit for enabling the inclination of at least one first circular saw blade when curve sawing a block in a cutting direction. The calculation unit comprises a receiver configured to receive a measurement signal from a measurement unit, relating to the block curvature in the direction of cutting. Further, the calculating unit also comprises a processor, configured to determine a radius of the curve sawing, based on the measurement of the curvature of the block in the cutting direction, and to calculate a vertical inclination angle of the first circular saw blade in a vertical plane relative to the cutting direction in the block, based on the determined radius of the curve sawing. The calculation unit also comprises a transmitter configured to transmit a control signal to a control unit, for inclining the first circular saw blade with the calculated vertical inclination angle.

By inclining, tilting or skewing the saw blade in the vertical plane when cutting with single blade, inclined saw-track is avoided. By correspondingly inclining the saw blades against each other when cutting with dual blades, so that both blades are tilted toward each other, it is avoided that the saw cuts becomes inclined both at the top and the bottom of the saw-track, or kerf. This increases the yield as crude measurements may be reduced when the cut boards become more rectangular than they otherwise would be. Thereby, the radius of curvature may be reduced, which further increases the yield.

Furthermore, according to some embodiments when cutting with dual blades, the blade shafts when cutting with double blades may be angled toward each other in a horizontal plane so that the intersection of the extensions of the respective blade shafts is located in the centre of curvature of the block. Thereby, back sawing and the broadening of the saw track created by back sawing is eliminated, or at least reduced, resulting in a higher yield and decreased logging waste.

Other advantages and additional novel features will become apparent from the following detailed description of the invention.

LIST OF FIGURES

The invention will now be described in further detail with reference to the accompanying figures, which illustrate embodiments of the invention:

DETAILED DESCRIPTION

The invention is defined as a method and a calculation unit, which may be realised in any of the below described embodiments. This invention may be implemented in many different forms and should not be seen as limited by the herein described embodiments. These described embodiments are rather intended to illustrate various aspects of the invention.

Further aspects and features of the invention may become apparent from the following detailed description, taken in conjunction with the accompanying drawings. Figures are however rather to be consider as examples of various embodiments of the invention and should not be viewed as limiting the invention, which is limited only by the accompanying patent claims. Furthermore, the figures are not necessarily drawn to scale and are, unless otherwise stated, intended to conceptually illustrate various aspects of the invention.

Figure 1A:
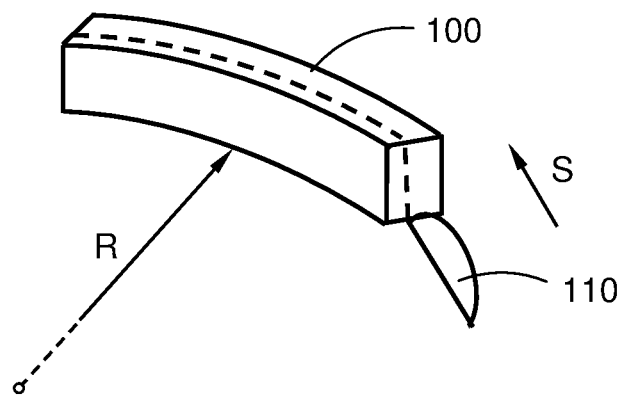
FIG. 1A is a schematic illustration showing curve sawing with a single blade saw according to an embodiment of the invention.

FIG. 1A shows curve sawing with single blade according to an embodiment of the invention. A block 100 of a certain curvature with a radius of curvature R is fed passing a first circular saw blade 110 in a curved path, wherein the first circular saw blade 110 herein will cut up a kerf, or saw cut (dashed line in the Figure) in a cutting direction S through the block 100. This first circular saw blade 110 may also be denominated single blade and is in the illustrated example performing as a division saw, as referenced in the background section.

In some embodiments, such division saw may also comprise a plurality of single blades which operate in parallel with each other to thereby partition the block 100 in boards and planks in one single fed of the block 100 through the division saw.

Figure 1B:
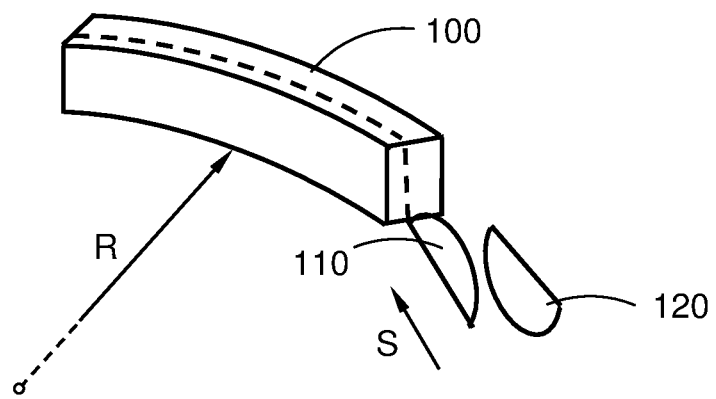
FIG. 1B is a schematic illustration showing curve sawing with a double blade saw according to an embodiment of the invention.

FIG. 1B illustrates curve sawing with double blade according to an embodiment of the invention. The block 100, which has a certain curvature with a radius of curvature R, is fed in a curved path passing the first circular saw blade 110 and a second circular saw blade 120, which thereby are cutting a kerf, or saw cut (dashed line) in the block 100, in the cutting direction S. This first circular saw blade 110, together with the second circular saw blade 120, which also may be termed double blade or dual blade, are in the illustrated example, performing as the division saw referenced in the background section.

In some embodiments, such division saw may also comprise a plurality of double blades which may operate in parallel with each other to thereby partition the block 100 in boards and planks in one single fed of the block 100 through the division saw.

Figure 2A:
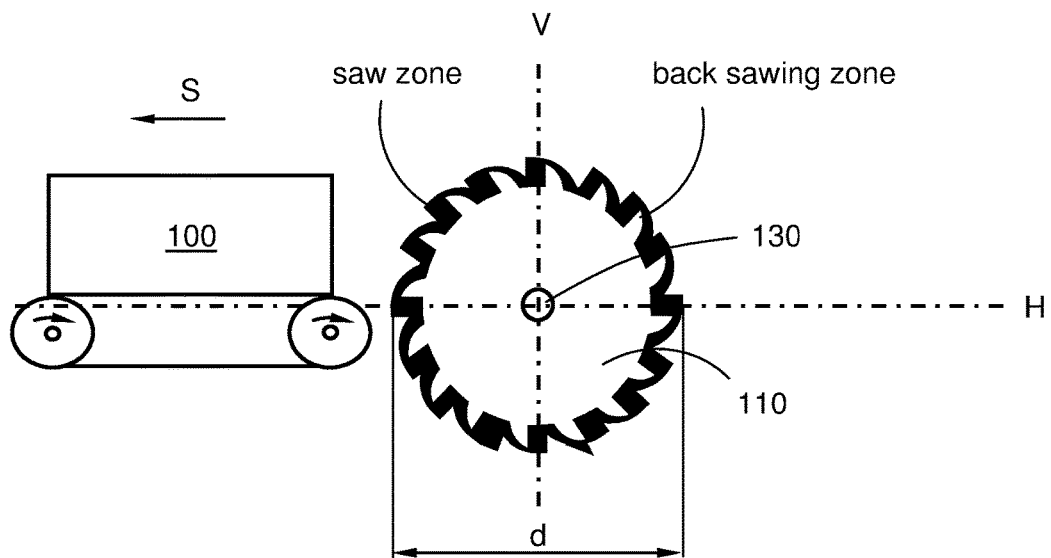
FIG. 2A is a schematic illustration showing curve sawing with a single blade saw in a side perspective, according to an embodiment of the invention.

FIG. 2A shows curve sawing in a single blade embodiment of the invention, illustrated in a side view. The block 100, which has a certain curvature with a radius of curvature R is fed in a curved path passing the first circular saw blade 110, whereby the first circular saw blade 110 herein will sawing up a kerf, or saw cut, in the cutting direction S through the block 100. The block 100 may for example be fed to the first circular saw blade 110 on a treadmill according to some embodiments. The first circular saw blade 110, which has a diameter d, rotates about a shaft 130 in a horizontal plane H. The rotation of the first circular blade 110 may be made either counter-clockwise, which is most common, or clockwise. Regardless of the direction of rotation of the circular saw blade 110, the desired sawing zone is situated in front of a vertical plane V passing through the first saw blade shaft 130, while an undesired back sawing zone is situated behind this vertical plane V, relative to the direction of cutting S.

Figure 2B:
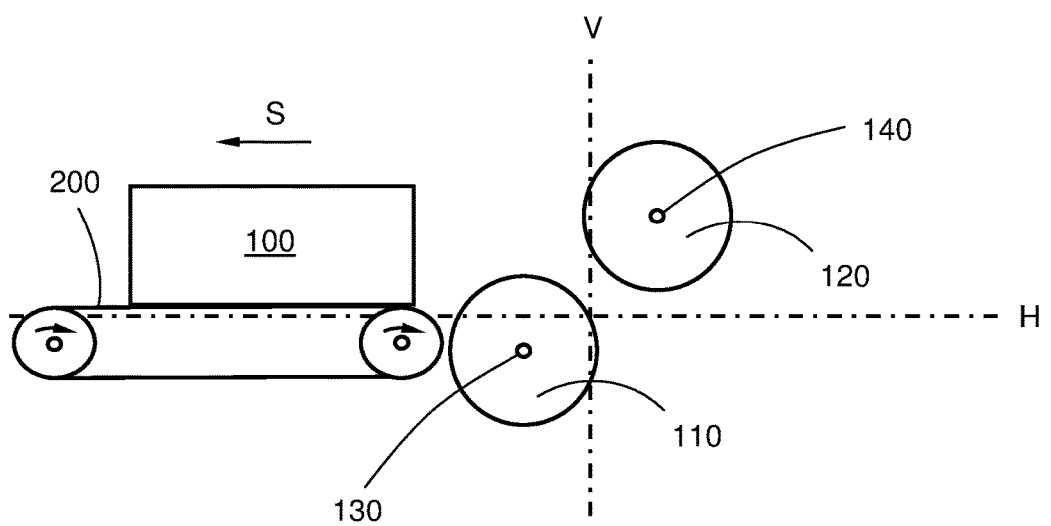
FIG. 2B is a schematic illustration showing curve sawing with a double blade saw in a side perspective, according to an embodiment of the invention.

FIG. 2B shows curve sawing with double blade of embodiment of the invention, viewed in side view. The block 100, which has a certain curvature with a radius of curvature R, is fed into a curved path passing the first circular saw blade 110 and the second circular saw blade 120 in a curved path, wherein the first circular saw blade 110 along with the other circular saw blade 120 herein will cut up a joint kerf in the direction of cutting S through the block 100. The block 100 may for example be fed to the first circular saw blade 110 and second circular saw blade 120 on a treadmill with a saw base 200 in which the block 100 is situated, in some embodiments. The first circular saw blade 110 rotates about a shaft 130 in the horizontal plane H. The second circular saw blade 120 rotates about a shaft 140 in the horizontal plane H.

The rotation of the first and second circular saw blades 110, 120 may be made either counterclockwise, which is most common, or clockwise in different embodiments. Regardless of the direction of rotation of the cutting circular saw blades 110, 120, the desired sawing zone is situated forward of a vertical plane V passing through the respective shafts 130, 140 of the respective cutting circular saw blades 110, 120; while an undesired back sawing zone is located behind the vertical plane V, in relation to the direction of cutting S.

Figure 3A:
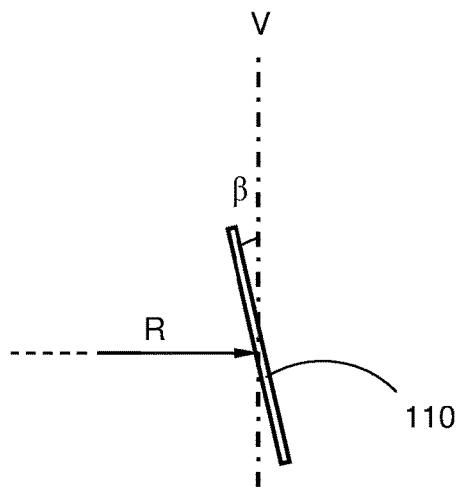
FIG. 3A is a schematic illustration showing curve sawing with a single blade saw according to an embodiment of the invention.

FIG. 3A is a schematic illustration showing curve sawing according to a single blade embodiment of the invention, wherein the first circular saw blade 110 is inclined at a vertical angle of inclination β in relation to the vertical plane V.

By inclining the circular saw blade 110 in the vertical plane V, with the vertical angle of inclination β slanted kerfs may be avoided when curve sawing the block 100. The size of such vertical inclination angle β may for example be determined as a function of the curvature radius R in some embodiments.

In this way, when the slanted kerfs are eliminated or at least reduced, the yield is increased as crude measures may be reduced. This in turn may also enable the curve radius R to be reduced, which further increases the yield and quality of the sawn timber when the curve sawing better follows the log curvature and thus the fibre direction of the wood. The wood has better strength properties in the fibre direction than in other directions. Back sawing may further be avoided, which reduces the width of the kerf and thereby also increases the yield further. Further reduced lateral load on the circular saw blade 110 thus enable further reduction of the curve radius R and in some embodiments also the blade thickness, further increasing the yield and quality of the sawn timber. By controlling the circular saw blade 110 according to an algorithm, or by a look-up table, a correction of the kerf created in the block 100 from curve sawing by the circular saw blade 110 is accomplished.

The vertical angle of inclination β may e.g. be set to 0.23 degrees in tight curves with a radius of curvature R of 50 meters. This represents a slope of 0.6 mm over a height of 150 mm. This is merely mentioned as an illustrative example of possible angle of inclination β. A typical size of the vertical angle of inclination β may in practice be less than 1 degree.

Further, the vertical angle of inclination β may depend not only by the curvature radius R, but also by further parameters according to some embodiments, such as the block height, blade diameter d and/or by a vertical distance from the centre of the circle saw blade to the saw base 200 on which the block 100 is situated, according to some embodiments.

Further, the vertical angle of inclination β may be calculated based on the following algorithm in some embodiments:

$$\beta = \arctan(X_{average} - X_{top})/((d/2) - u),$$

wherein:

$$X_{average} = (X_{start} + X_{end})/2;$$

$$X_{top} = R(1 - \cos \alpha_{top})/\cos \alpha_{top};$$

$$X_{end} = R(1 - \cos \alpha_{end})/\cos \alpha_{end};$$

$$X_{start} = R(1 - \cos \alpha_{start})/\cos \alpha_{start};$$

$$\alpha_{top} = \arctan(-e/2)/R;$$

$$\alpha_{end} = \arctan(d/2 \sin \gamma_{end} - (e/2))/R;$$

$$\alpha_{start} = \arctan(d/2 \sin \gamma_{start} - (e/2))/R;$$

$$\gamma_{start} = \arccos(u/(d/2));$$

$$\gamma_{end} = -\gamma_{start};$$

$$\gamma_{top} = 0;$$

u=the vertical distance from the centre of the circular saw blade to the saw base 200 on which the block 100 is placed during the sawing; and d=diameter of the circular saw blade.

Figure 3B:
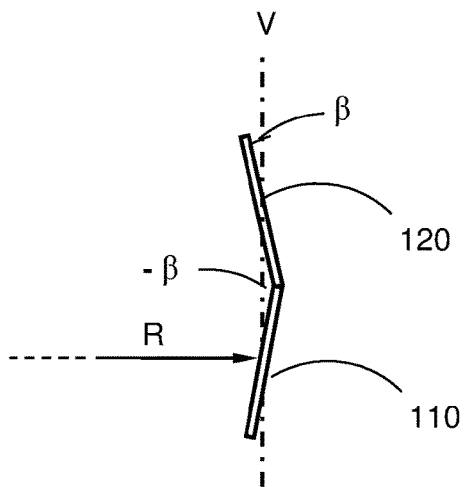
FIG. 3B is a schematic illustration showing curve sawing with a double blade saw according to an embodiment of the invention.

FIG. 3B is a schematic illustration depicting curve sawing with double blade according to an embodiment of the invention, wherein the second circular saw blade 120 is inclined with a vertical angle of inclination β, and the first circular saw blade 110 is inclined at a vertical angle of inclination −β, relative to the vertical plane V. Hereby, by allowing the circular saw blades 110, 120 to lean against each other, such that tilting of both upper and lower part of the kerf may be avoided during curve sawing of the block 100. The magnitude of this vertical angle of inclination β and −β respectively, may for example be determined as a function of the radius of curvature R in some embodiments.

In this way, as the saw cut slope, or tilting kerf as it also may be referred to as, may be eliminated or at least reduced, the yield may be increased as crude measures may be reduced. This in turn may also lead to that the curve radius R may be reduced, which further may increase the yield and quality of the sawn timber as the made curve sawing better follows the log curvature and thus the fibre direction of the wood. The timber has better strength properties in the fibre direction than in other directions. Further, back sawing may be avoided, which reduces the width of the saw cut and thereby further increase the yield. In addition, the lateral load on the circular saw blades 110, 120 is reduced, which makes it possible to further reduce the curve radius R and in some embodiments even saw blade thickness, further increasing the yield and quality of the sawn timber. By controlling the circular saw blades 110, 120 according to an algorithm, or by a look-up table, a correction of the saw cut when curve sawing with the circular saw blades 110, 120 through the block 100 may be achieved.

The vertical angle of inclination β and −β respectively, may e.g. be set to 0.23/−0.23 degrees in tight curves with a radius of curvature R of 50 meters. This represents a slope of 0.6 mm over a height of 150 mm. This is merely mentioned as an illustrative example of possible angle of inclination β. A typical size of the vertical angle of inclination β/−β may in practice be less than 1 degree.

Further, the vertical angle of inclination β/−β may depend not only on the curvature radius R, but also on further parameters according to some embodiments, such as on the block height, blade diameter d and/or by a vertical distance from the centre of the circular saw blade to the saw base 200 on which the block 100 is placed, according to some embodiments.

Further, the vertical angle of inclination β/−β may be calculated based on the following algorithm in some embodiments:

$$\beta = \arctan(X_{average} - X_{top})/((d/2) - u),$$

$$-\beta = -\arctan(X_{average} - X_{top})/((d/2) - u),$$

wherein:

$$X_{average} = (X_{start} - X_{end})/2;$$

$$X_{top} = R(1 - \cos \alpha_{top})/\cos \alpha_{top};$$

$X_{end} = R(1-\cos \alpha_{end})/\cos \alpha_{end}$;

$X_{start} = R(1-\cos \alpha_{start})/\cos \alpha_{start}$;

$\alpha_{top} = \arctan(-e/2)/R$;

$\alpha_{end} = \arctan(d/2 \sin \gamma_{end} - (e/2))/R$;

$\alpha_{start} = \arctan(d/2 \sin \gamma_{start} - (e/2))/R$;

$\gamma_{start} = \arccos(u/(d/2))$;

$\gamma_{end} = -\gamma_{start}$;

$\gamma_{top} = 0$;

$u$ = the vertical distance between the centre of the circular saw blade and the saw base 200 on which the block 100 is placed during the sawing; and $d$ = diameter of the circular saw blade.

Figure 4:
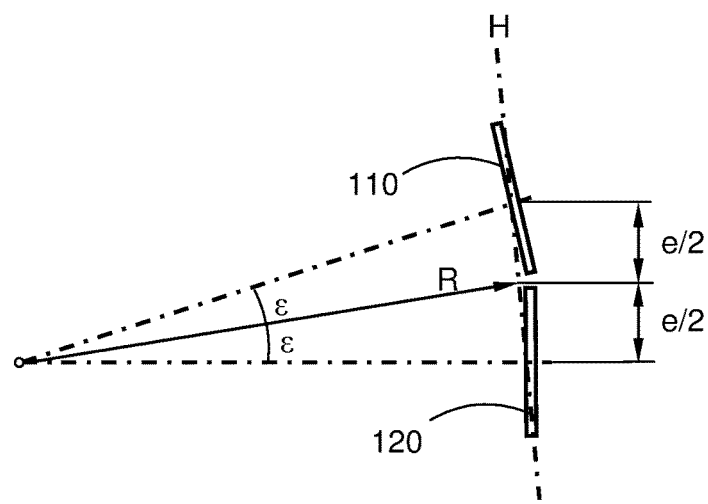
FIG. 4 is a schematic illustration showing curve sawing with a double blade saw according to an embodiment of the invention as seen from above.

FIG. 4 is a schematic illustration showing the curve sawing with double blade according to the embodiment of the invention, seen in a top view.

The blade axes of the first circular saw blade 110 and second circular saw blade 120 are here angled toward each other in the horizontal plane H with a horizontal angle ε, for pointing to a common centre of curvature. This angling with a respective horizontal inclination angle ε may in some embodiments be made variable as a function of the position of the centre of curvature and thus be a function of the radius of curvature R.

Hereby, the saw cut slope, or tilting kerf, or inclination of the saw cut may be eliminated or at least reduced. This increases the yield as crude measurements may be reduced. This in turn may also lead to that the curve radius R may be reduced, which further increases the yield and quality of the sawn timber when the curve sawing may better follow the log curvature and thus the fibre direction of the wood. The wood has better strength properties in the fibre direction than in other directions. Back sawing may be further avoided, thus reducing width of the saw cut and thereby further increase the yield. In addition, the lateral load on the circular saw blades 110, 120 is reduced, which makes it possible to further reduce the curve radius R and in some embodiments even saw blade thickness, further increasing the yield and quality of the sawn timber. By controlling the horizontal angle of inclination ε of the circular saw blades 110, 120 according to an algorithm, or by a look-up table, a correction of the saw cut when curve sawing with the circular saw blades 110, 120 through the block 100 may be achieved.

The horizontal angle of inclination ε of the first circular saw blade 110 and the second circular saw blade 120 may in some embodiments be based, in addition to being based on the determined radius R of the curve sawing, on a distance e/2 in the cutting direction S between the centre of circle saw blade and a centre plane for the radius R of the curve sawing of the block 100 according to some embodiments.

The horizontal inclination angle ε of the first circular saw blade 110 and/or the second circular saw blade 120 may for example be based on the following algorithm according to some embodiments:

$\varepsilon = \arctan((e/2)/R)$, wherein e/2 = a distance in the direction of cutting S between the centre of the circle saw blade and a centre plane of the radius R of the curve sawing of the block 100.

Figure 5:
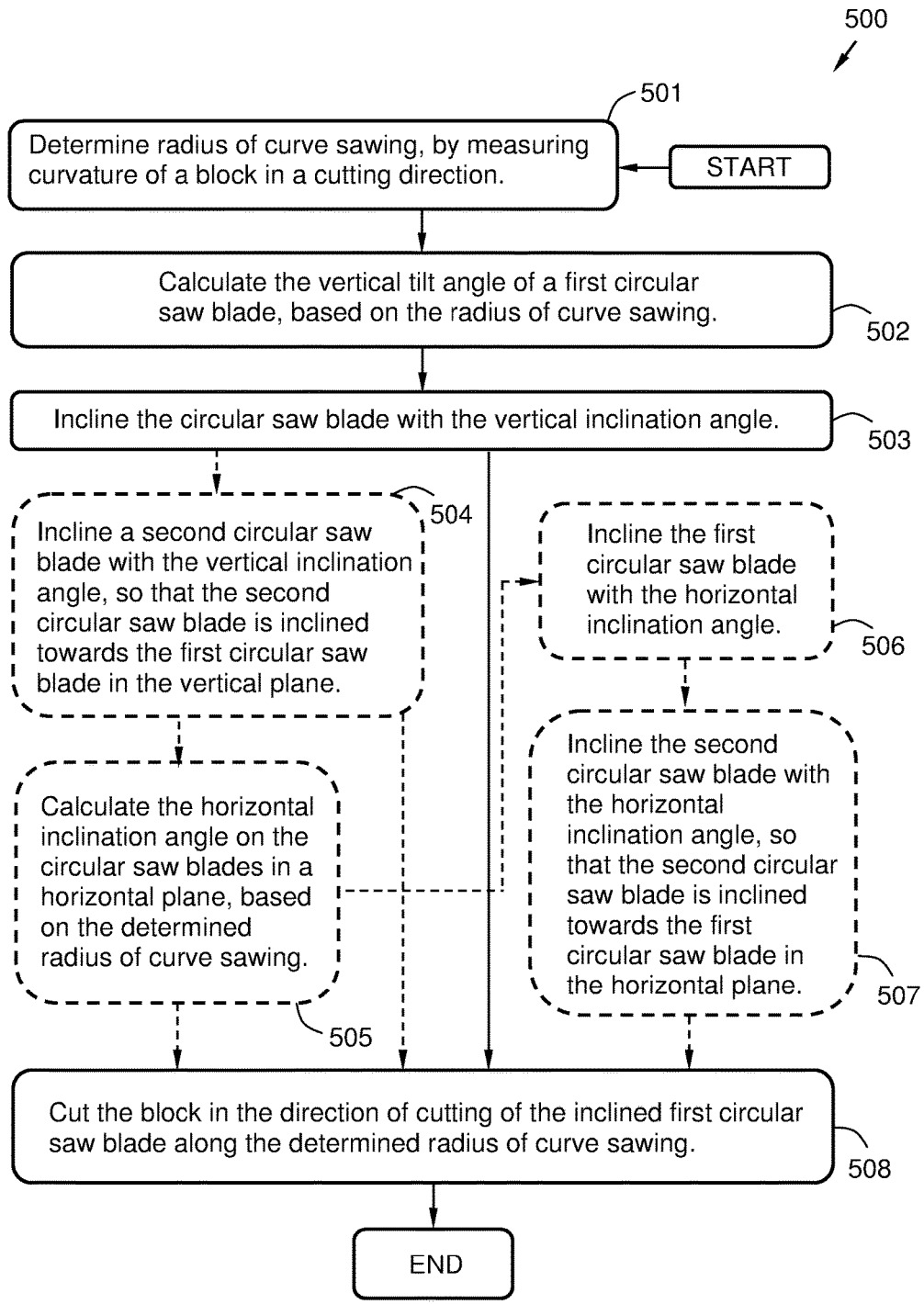
FIG. 5 is a flow diagram illustrating an embodiment of a method for curve sawing.

FIG. 5 is a flow diagram illustrating an embodiment of a curve cutting methodology. The flow chart of FIG. 5 illustrates a method 500 for curve sawing in a cutting direction S of a block 100 with at least one first circular saw blade 110. The block 100 may comprise a log of wood on which the sides have been previously cut. The log of wood may comprise any arbitrary kind of wood, such as e.g. pine, spruce, oak, beech, birch or similar. The block 100 has a curvature in the cutting direction S with a radius of curvature R. This radius of curvature R may vary along the block length, or be constant in different embodiments.

To perform curve sawing correctly, the method 500 comprises a number of actions 501-508. It should be noted that some of the described actions may be comprised only in some alternative embodiments of the invention, such as actions 504-507. Further, it is noted that the described actions may be performed in a somewhat different chronological order than the order number indicates, and/or that some of them may be performed in parallel. The procedure 500 comprises the following actions:

Action 501

A radius R of the curve sawing is determined by measuring the curvature of the block 100 in the cutting direction S. The cutting direction S is situated in the horizontal plane H and is opposite to the feed direction of the block 100.

This measurement may be performed before the log arrives to the stock-taking saw, or while the block 100 is located between the stock-taking saw and dividing saw according to various embodiments. Further, measurements of the curvature of the block 100 may be repeated continuously according to some embodiments, while the block 100 is processed.

Further, the determined radius R of the curve sawing may vary along the cutting direction S of the block 100, e.g., when the block 100 has an S-shape or the like. Thus, according to some embodiments, a plurality of radii R of the block 100 may be determined, which varies along the direction of cutting S.

Action 502

A vertical angle of inclination β of the first circular saw blade 110 is calculated in a vertical plane V in relation to the direction of cutting S in the block 100, based on the determined radius R of the curve sawing.

The calculation of the vertical angle of inclination β of the first circular saw blade 110 and/or second circular saw blade 120 may in some embodiments be based on, in addition to the determined radius R of the curve sawing, on the diameter d of the circular saw blade and/or the vertical distance u from the centre of the circular saw blade to a saw base 200, on which the block 100 is situated.

According to some embodiments, the calculation of the vertical angle of inclination β of the first circular saw blade 110 and/or the second circular saw blade 120 may be based for example on the following algorithm:

$\beta = \arctan(X_{average} - X_{top})/((d/2) - u)$, wherein:

$X_{average} = (X_{start} + X_{end})/2$;

$X_{top} = R(1-\cos \alpha_{top})/\cos \alpha_{top}$;

$X_{end} = R(1-\cos \alpha_{end})/\cos \alpha_{end}$;

$X_{start} = R(1-\cos \alpha_{start})/\cos \alpha_{start}$;

$\alpha_{top} = \arctan(-e/2)/R$;

$\alpha_{end}=\arctan(d/2 \sin \gamma_{end}-(e/2))/R;$ $\alpha_{start}=\arctan(d/2 \sin \gamma_{start}-(e/2))/R;$ $\gamma_{start}=\arccos(u/(d/2));$ $\gamma_{end}=-\gamma_{start};$ $\gamma_{top}=0;$ $u$=the vertical distance between the centre of the circular saw blade and the saw base 200 on which the block 100 is placed during the sawing; and $d$=diameter of the circular saw blade.

Action 503

The first circular saw blade 110 is inclined by the estimated 502 vertical angle of inclination β.

By inclining the first circular saw blade 110 in the vertical plane V with the vertical angle of inclination β when cutting with single blade, a sloped kerf may be avoided, or at least may problems associated with such sloped kerf be reduced. This increases the yield as crude measurements may be reduced when the cut boards become more rectangular than they otherwise would be.

Another effect of inclining the circular saw blade 110 with the calculated 502 vertical angle of inclination β in the vertical plane V is that the curve radius R may be reduced. Hereby is it enabled to make curved cuts with a smaller radius of curvature R than previously possible because of the resulting slope of the kerf in the prior art. By enabling curve sawing with tighter radius R, it is possible to further increase the yield and quality of the cut boards when the logs frequently are more curved than the minimum radius of curvature R that according to prior art solutions may be possible to follow during curve sawing.

Action 504

This action may be performed in some alternative embodiments of the method 500, wherein the curve sawing is performed by the first circular saw blade 110 and a second circular saw blade 120, which is positioned offset in the vertical plane V in relation to the first circular saw blade 110. The circular saw blades 110, 120 may saw a single joint saw cut through the block 100 along the determined 501 radius R of the curve sawing.

The second circular saw blade 120 may be inclined with the calculated 502 vertical angle of inclination β in the opposite direction in the vertical plane V in relation to the first circular saw blade 110, so that the second circular saw blade 120 is inclined towards the first circular saw blade 110 in the vertical plane V. An example of such inclination of first and second circular saw blades 110, 120 is illustrated in FIG. 3B.

By inclining the circular saw blades 110, 120 in the vertical plane V, with the vertical angle of inclination β, it may be avoided that the kerf is tilted at both the top and bottom of the kerf. Thereby slanted kerfs may be avoided or at least may the problems associated with such slanted kerfs be reduced. Thus, the yield increased by crude measurements may be reduced when they sawed boards become more rectangular than they otherwise would be.

Action 505

This action may be performed in some alternative embodiments of the method 500, in which action 504 has been performed.

A horizontal inclination angle ε may be calculated for the first circular saw blade 110 and the second circular saw blade 120 in a horizontal plane H in relation to the direction of cutting S in the block 100, based on the determined radius R of the curve sawing.

The calculation of the horizontal angle of inclination ε of the first circular saw blade 110 and the second circular saw blade 120 may in some embodiments be based on, in addition to the determined radius R of the curve sawing, on a distance e/2 in the direction of cutting S between the circular saw blade centre and a centre plane of radius R of the curve sawing of the block 100.

The horizontal angle of inclination ε of the first circular saw blade 110 and/or the second circular saw blade 120 may according to some embodiments be based on the following algorithm:

$\varepsilon=\arctan((e/2)/R),$ wherein:

e/2=a distance in the direction of cutting S between the centre of the circle saw blade and a centre plane of the radius R of the curve sawing of the block 100.

Action 506

This action may be performed in some alternative embodiments of the method 500, in which action 504 and action 505 have been performed.

The first circular saw blade 110 may be inclined by the estimated 505 horizontal angle of inclination ε.

Thereby back sawing may be avoided when sawing with double blades, as the lateral load on the circular saw blades 110, 120 decreases. This leads to reduced kerf width and thus also increased yield as less wood is lost in sawdust. In addition, by the decreased lateral load on the circular saw blades 110, 120, blade thickness of the circular saw blades 110, 120 may be reduced, further reducing chip wastage and leading to furthermore increased yield.

Action 507

This action may be performed in some alternative embodiments of the method 500, in which action 504, action 505 and action 506 have been performed.

The second circular saw blade 120 may be inclined with the calculated 505 horizontal angle of inclination ε but in the opposite direction in the horizontal plane H with respect to the first circular saw blade 110 so that the second circular saw blade 120 is inclined towards the first circular saw blade 110 in the horizontal plane H.

Action 508

The block 100 is cut into the direction of cutting S with the inclined 503 first circular saw blade 110 along the determined 501 radius R of the curve sawing.

According to some embodiments, the method 500 may be performed continuously during the sawing of the block 100. Hereupon, the radius of curvature R may be continuously measured and remeasured at the block 100 and the vertical inclination angle β, respectively, the horizontal angle of inclination ε recalculated based on such continuous measurement. It is thereby enabled sawing along a varying radius R of the curve sawing of the block 100, as well as a varying slope in the vertical plane V and possibly the horizontal plane H, depending on the varying radius R.

Thereby curved cuts are enabled that better follows the block curvature, cutting the boards better following the grain of the wood. This increases the quality of the cut boards further.

Figure 6A:
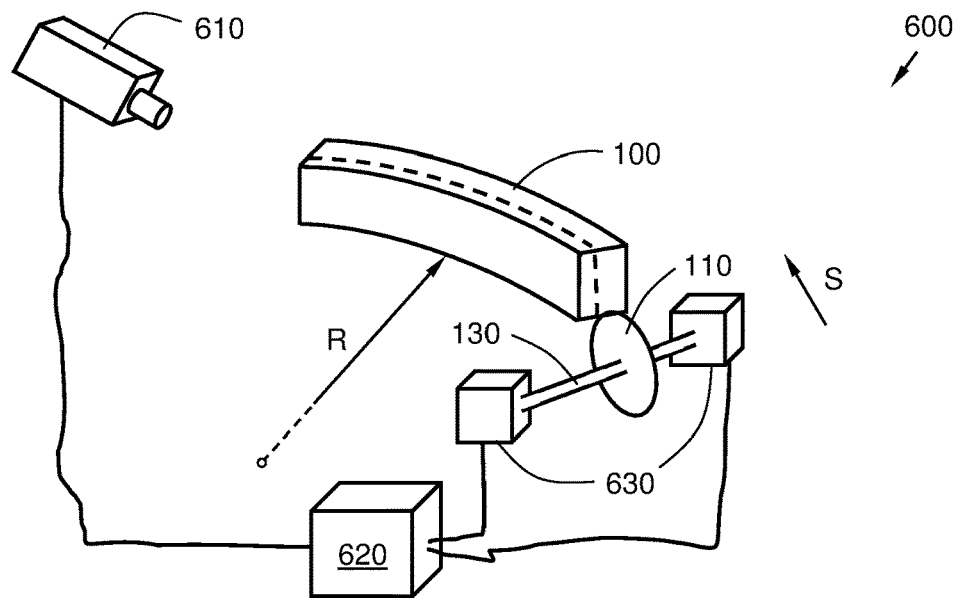
FIG. 6A is a schematic illustration showing curve sawing with a single blade saw according to an embodiment of the invention.

FIG. 6A shows a system 600 configured to incline at least one first circular saw blade 110 during curve sawing in a cutting direction S of a block 100, when curved cutting is made with a single blade. As previously mentioned, a plurality of circular saw blades may be mounted in parallel in a horizontal plane, for example on the same shaft 130, whereby the final cutting of a plurality of boards of the block 100 may be made in one single feed according to some embodiments.

The system 600 comprises a measuring unit 610, configured to measure the curvature in the direction of cutting S of the block 100. This measurement device 610 may for example measure the distance to some measurement points on the block 100 by means such as light, e.g. laser, or other electromagnetic radiation. Hereupon, laser triangulation may be used for performing the measurement in accordance with certain embodiments. In some embodiments, the measuring device 610 may comprise e.g. a 3D camera, a Time of Flight (TOF) camera, a stereo camera, a light-field camera, or the like. The measurement device 610 may further for example comprise a 3D log scanner in certain embodiments. Such 3D measurement frame may comprise laser light measures of the distance to the surface of the block 100 as it passes through the measurement frame. Thereby, the whole surface of the log to be seen and each measuring beam has in turn a plurality of laser measuring devices.

The measurement unit 610 may for example determine the distance of a measurement point on the block 100 by emitting a modulated light wave, detecting the corresponding reflected light wave from the measuring point at block 100 and measuring the reflected light wave offset relative to the emitted light wave. The distance to the respective measuring points may then be calculated as the wavelength of light and the speed is known parameters.

A Time-of-Flight camera is a camera that takes a sequence of images and measuring a distance to an object based on the known speed of light by measuring the time required for a light signal between the camera and subject/object.

Figure 7:
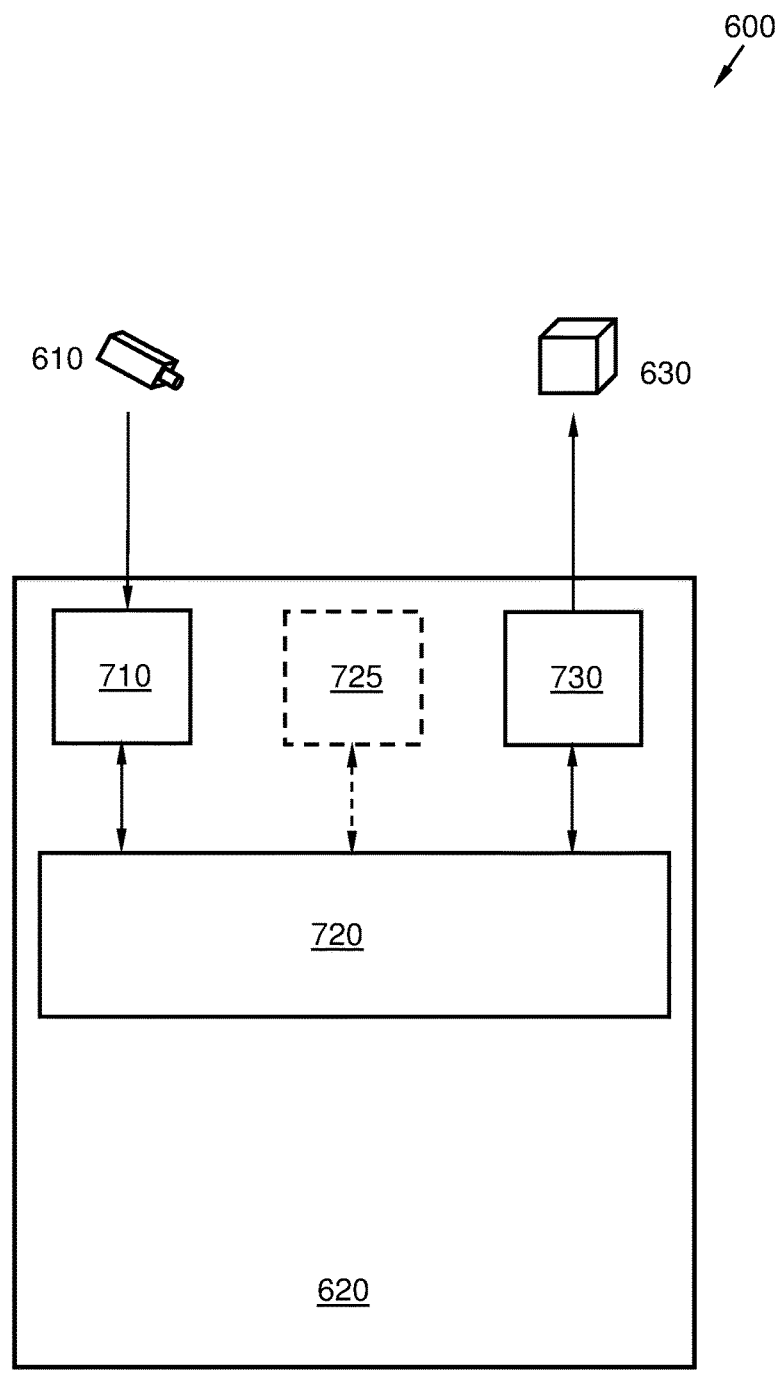
FIG. 7 is an illustration of a calculating unit according to an embodiment of the invention.

The measurement unit 610 may then transmit the measured distances to measuring points on the block 100 to a calculation unit 620, which is also comprised in the system 600. The calculation unit 620, which will be described in conjunction with the description of FIG. 7, is configured to perform calculations based on measurements received from the measurement device 610, which calculations may establish such block curvature radius R to be utilised when curve sawing the block 100. Further, the calculation unit 620 may be configured to calculate a vertical angle of inclination β of the first circular saw blade 110 in a vertical plane V in relation to the cutting direction S of the block 100, based on the determined radius R of the curve sawing. The calculation unit 620 may comprise for example a computer or similar device with the required computing capacity.

The measurement unit 610 may also be configured to generate and transmit a control signal to a control unit 630, which is also comprised in the system 600. The control unit 630, which for example may be situated in at least one end of the first shaft 130 of the first circular saw blade 110, may cause inclination of the first circular saw blade 110 with the calculated vertical angle of inclination β, for example, by inclining the first circular saw-blade shaft 130, in either or both of the mounting points of the shaft 130.

The measurement unit 610, the calculation unit 620 and the control unit 630, which are comprised in the system 600 may comprise distinct logical entities, or may alternatively in some embodiments be housed in the same or partly the same physical device. For example, the calculation unit 620 may be comprised within the measurement device 610 or the control unit 630 in some embodiments. Further, the listed devices 610, 620, 630 are arranged to communicate with each other over a wired or wireless interface.

Such wireless interface may comprise communication via radio waves, for example, based on, or inspired by, any of the following technologies: GSM, EDGE, UMTS, CDMA, CDMA2000, TD-SCDMA, LTE, LTE-Advanced; Wi-Fi, according to one of the IEEE standards 802.11 a, b, g and/or n, IP, Bluetooth and/or NFC (Near Field Communication).

Said wired interface may comprise e.g. a cable connection, an Internet-connected network or a communication system comprising one or more communication buses to interconnect the enumerated units 610, 620, 630 with each other and alternatively also with other devices such as a controller and/or sensor. The communication bus may for example comprise one or more of a cable; a data bus, such as a CAN bus (Controller Area Network bus), a MOST bus (Media Oriented Systems Transport), or any other bus configuration; or alternatively a wireless connection, based on e.g. any of the above listed technologies for wireless communication.

Figure 6B:
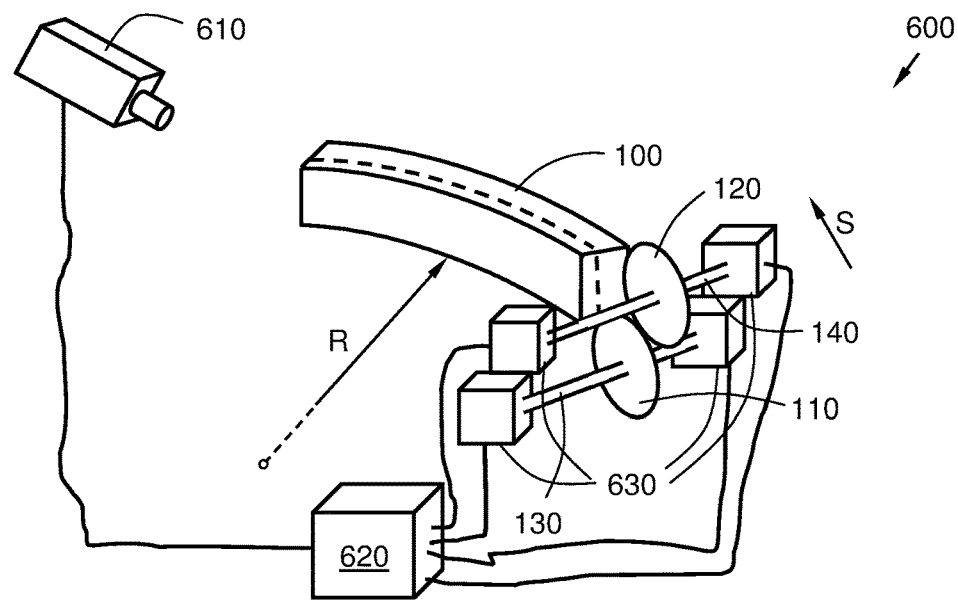
FIG. 6B is a schematic illustration showing curve sawing with a double blade saw according to an embodiment of the invention.

FIG. 6B illustrates an embodiment of the system 600, configured for inclination, or misalignment, of a first circular saw blade 110 and a second circular saw blade 120 when performing curve sawing in a saw direction S of a block 100, i.e., performing curve sawing with dual blade. As previously mentioned, a plurality of circular saw blades 110, 120 may be mounted parallel to the horizontal, for example at the same respective shaft 130, 140, whereby the simultaneous cutting of a plurality of boards in the block 100 is made possible according to some embodiments.

In this illustrative scenario, the curve sawing of the first circular saw blade 110 and the second circular saw blade 120, which second circular saw blade 120 is positioned offset in the vertical plane V in relation to the first circular saw blade 110 (and in some alternative embodiments displaced also in the horizontal plane H), saw a single joint saw cut through the block 100 along with the determined radius R of the curve sawing. The control unit 630 is thereby further configured to incline also the second circular saw blade 120 with the calculated vertical inclination angle β in the opposite direction in the vertical plane V in relation to the first circular saw blade 110 so that the second circular saw blade 120 is inclined towards the first circular saw blade 110 in the vertical plane V. This feature has previously been illustrated in FIG. 3B and as further explained in conjunction with the description of FIG. 3B.

Further, the calculating unit 620 according to some embodiments may be configured to calculate a horizontal angle of inclination ε of the first circular saw blade 110 and the second circular saw blade 120 in a horizontal plane H in relation to the direction of cutting S in the block 100, based on the determined radius R of the curve sawing. Hereupon, although the control unit 630 may be configured to incline the first circular saw blade 110 with the calculated horizontal inclination angle ε, and to incline the second circular saw blade 120 with the calculated horizontal inclination angle ε but in the opposite direction in the horizontal plane H with respect to the first circular saw blade 110, such that the second circular saw blade 120 is inclined towards the first circular saw blade 110 in the horizontal plane H. This relationship is illustrated in FIG. 4 and discussed in detail in the corresponding text of the description.

The control unit 630 may, according to some embodiments comprise a plurality of physical devices, arranged to operate on the shaft 130 of the first circular saw blade 110, and/or the shaft 140 of the second circular saw blade 120, in the horizontal plane and/or the vertical plane respectively, such that the desired angular relationship of the circular saw blades 110, 120 is obtained.

FIG. 7 is also illustrating a schematic overview of the system 600, configured to incline at least one first circular saw blade 110 when performing curve sawing of a block 100 in a saw direction S, but with a particular focus on calculating unit 620.

The calculation unit 620 is configured to perform at least some of the previously-described actions 501-508, comprised in the description of the method 500 for curve sawing of a block 100 in a direction of sawing S with at least one first circular saw blade 110.

The calculation unit 620 enables inclination or misalignment, i.e. skew or bias, of at least a first circular saw blade 110, when performing curve sawing of the block 100 in the direction of sawing S. The calculation unit 620 may for example comprise a computer or the like in some embodiments. Such computer may be e.g., a desktop computer, a server, a mobile computer, a PDA, a tablet, a phone, a netbook or similar.

In order to correctly calculate and thereby enable inclination of the circular saw blade 110, or circular saw blades 110, 120, the calculating unit 620 comprise a number of components, which are detailed in the following detailed description. It may be noted that some of the described components may be present in some embodiments only. Furthermore, it is noted that some additional electronics of the calculation unit 620, not entirely required in order to understand the function of the calculation unit 620 according to the invention, has not been depicted in FIG. 7, to not impede or unnecessarily complicate the understanding of the invention.

The calculation unit 620 comprises a receiver 710. The receiver 710 is configured to receive a measurement signal from a measurement unit 610, comprising information related to the curvature of the block 100 in the cutting direction S.

The receiver 710 is configured to receive the measurement signal from the measurement unit 610 over a wired or wireless interface according to different embodiments.

Furthermore, the calculation unit 620 comprises a processor 720. The processor 720 is configured to determine a radius R of the curve sawing, based on the received result of the measurement of the curvature of the block 100 in the cutting direction S. The processor 720 is also configured to calculate a vertical inclination angle β of the first circular saw blade 110 in a vertical plane V, in relation to the cutting direction S in the block 100, based on the determined radius R of the curve sawing.

The processor 720 may comprise, for example, one or more Central Processing Unit(s) (CPU), microprocessor(s) or other logic designed to interpret and execute instructions and/or to read and write data. The processor 720 may handle data for input, outflow or computing of data, also comprising data buffering, control and the like.

In some embodiments, the processor 720 may be further configured to calculate a horizontal inclination angle ε of the first circular saw blade 110 and the second circular saw blade 120, in a horizontal plane H in relation to the cutting direction S in the block 100, based on the determined radius R of the curve sawing, in some embodiments.

The calculation unit 620 also comprises a transmitter 730. Transmitter 730 is configured to send a control signal to a control unit 630, comprising an instruction for inclining the first circular saw blade 110 with the calculated vertical inclination angle β.

According to certain embodiments the curve sawing may be performed by means of the first circular saw blade 110 and a second circular saw blade 120, which is positioned in offset in the vertical plane V in relation to the first circular saw blade 110. Said saw blades 110, 120 may create a single joint saw cut through the block 100 along the determined radius R of the curve sawing.

The transmitter 730 may then be further configured to send a control signal to the control unit 630, for inclining the second circular saw blade 120 with the calculated vertical inclination angle β, but in the opposite direction in the vertical plane V in relation to the first circular saw blade 110 so that the second circular saw blade 120 is inclined toward the first circular saw blade 110 in the vertical plane V.

The transmitter 730 may also be configured to send a control signal to the control unit 630, for inclining the first circular saw blade 110 with the calculated horizontal angle of inclination ε, and inclining the second circular saw blade 120 with the calculated horizontal inclination angle ε but in the opposite direction in the horizontal plane H, relative to the first circular saw blade 110 so that the second circular saw blade 120 is inclined towards the first circular saw blade 110 in the horizontal plane H, which is illustrated in FIG. 4.

The transmitter 730 is configured to transmit the control signal to the control unit 630 over a wired or wireless interface, such as e.g. any of the aforementioned wired or wireless interfaces.

Further, the calculation unit 620 may comprise, or be connectable to, a volatile or non-volatile data memory 725 i.e., a storage means for data such as e.g., a memory card, a flash drive, a USB memory stick, a hard drive or other similar data storage device. On the data memory 725 may for example information related to certain curve radii R be stored in a look-up table or the like, associated with various respective corresponding values of the vertical inclination angle β, and/or the horizontal inclination angle ε.

In some embodiments, the calculation unit 620 may comprise or be connectable to a monitor (not shown). The monitor may be configured to show and/or illustrate information related to the curve sawing, such as text or image illustrating aspects of the curve sawing to a human operator of the saw.

Furthermore some embodiments of the invention may comprise a computer program for controlling the curve sawing of the block 100 in the cutting direction S with at least one first circular saw blade 110. Such a computer program may be configured to perform the method 500, according to at least one of the actions 501-508 when the computer program is executed in the processor 720 in the calculation unit 620.

The actions 501-508 previously described may be implemented by one or more processors 720 of the calculation unit 620, along with computer program code for performing any, some or all of the actions 501-508. Thereby, a computer program comprising instructions for performing the actions 501-508, may calculate a vertical inclination angle β of the first circular saw blade 110 in a vertical plane V in relation to the direction of cutting S in a block 100 with a particular measured radius R of the curve sawing, thereby enabling inclination of the first circular saw blade 110 with the calculated vertical inclination angle β, then the computer program is loaded into the processor 720.

The invention claimed is:

1. A method for curve sawing of a block in a cutting direction with at least a first circular saw blade, wherein the cutting direction lies within a first plane and wherein the first circular saw blade lies within said first plane while in a reference position, which method comprises:

determining a radius of curvature of a first portion of the block based at least on a measurement of said curvature;

calculating a first inclination angle for the first circular saw blade relative to the first plane, based on the determined radius;

inclining the first circular saw blade to the first inclination angle by rotating the first circular saw blade a first rotational distance, in a first direction, about a first axis that extends through the first circular saw blade generally parallel to the cutting direction; and sawing the first portion of the block in the cutting direction with the inclined first circular saw blade.

2. The method according to claim 1, wherein the curve sawing is performed by the first circular saw blade and a second circular saw blade, which is offset from the first circular saw blade along the cutting direction, to thereby jointly create a common saw cut through the block, the method further comprising:

inclining the second circular saw blade by rotating the second circular saw blade said first rotational distance, but in an opposite direction, about a first corresponding axis that extends through the second circular saw blade generally parallel to the cutting direction, such that the second circular saw blade is inclined towards the first circular saw blade.

3. The method according to claim 2, further comprising:
calculating a second inclination angle for the first circular saw blade about a second axis based on the determined radius, wherein the second axis extends through the first circular saw blade perpendicular to the first axis;

inclining the first circular saw blade to the calculated second inclination angle by rotating the first circular saw blade a second rotational distance about the second axis in a second direction, and inclining the second circular saw blade a by rotating the second circular saw blade said second rotational distance, but in an opposite direction, about a second corresponding axis that extends through the second circular saw blade perpendicular to the first corresponding axis.

4. The method according to claim 3, wherein the calculation of the second inclination angle is based at least on part on a distance in the cutting direction between the center of the first circular saw blade and a center plane of the radius of curvature.

5. The method according to claim 4, wherein the calculation of the second inclination angle is based on the following algorithm:

$$\varepsilon = \arctan((e2)/R),$$

wherein: $e/2$=a distance in the cutting direction between the center of the circular saw blade and a center plane of the radius of curvature.

6. The method according to claim 2, wherein the calculation of the first inclination angle is based at least in part on a diameter of the first circular saw blade or a vertical distance between the center of the first circular saw blade and a saw base on which the block is placed.

7. The method according to claim 6, wherein the calculation of the first inclination angle is based on the following algorithm:

$$\beta = \arctan(X_{average} - X_{top})/((d/2) - u),$$

wherein:

$$X_{average} = (X_{start} + X_{end})/2;$$

$$X_{top} = R(1 - \cos \alpha_{top})/\cos \alpha_{top};$$

$$X_{end} = R(1 - \cos \alpha_{end})/\cos \alpha_{end};$$

$$X_{start} = R(1 - \cos \alpha_{start})/\cos \alpha_{start};$$

$$\alpha_{top} = \arctan(-e/2)/R;$$

$$\alpha_{end} = \arctan(d/2 \sin \gamma_{end} - (e/2))/R;$$

$$\alpha_{start} = \arctan(d/2 \sin \gamma_{start} - (e/2))/R;$$

$$\gamma_{start} = \arccos(u/(d/2));$$

$$\gamma_{end} = -\gamma_{start};$$

$$\gamma_{top} = 0;$$

$u$=the vertical distance between the centre of the circular saw blade and the saw base on which the block is placed during the sawing; and $d$=diameter of the circular saw blade.

8. A calculation unit for enabling inclination of at least one first circular saw blade when performing curved sawing of a block in a cutting direction, wherein the cutting direction lies within a first plane and wherein the first circular saw blade lies within said first plane while in a reference position, which calculation unit comprises:

a receiver configured to receive a measurement signal from a measuring unit relating to a curvature of the block in the cutting direction;

a processor configured to determine a radius of curvature of at least a first portion of the block based on the measurement of the curvature of the block in the cutting direction, and to calculate a first inclination angle for the first circular saw blade about a first axis, relative to the first plane, based on the determined radius of the curve sawing, wherein the first axis extends through the first circular saw blade generally parallel to the cutting direction; and a transmitter configured to send a control signal to a control unit to cause the control unit to incline the first circular saw blade to the calculated first inclination angle by rotating the first circular saw blade a first rotational distance, in a first direction, about the first axis.

9. The calculation unit according to claim 8, wherein the curve sawing is performed by the first circular saw blade and a second circular saw blade that is positioned offset in the vertical plane relative to the first circular saw blade, to thereby jointly create a single saw cut through the block, wherein the transmitter is further configured to send a control signal to the control unit to cause the control unit to incline the second circular saw blade by rotating the second circular saw blade said first rotational distance, but in an opposite direction, about a first corresponding axis that extends through the second circular saw blade generally parallel with the cutting direction, so that the second circular saw blade is inclined towards the first circular saw blade.

10. The calculation unit of claim 9, wherein the processor is further configured to calculate a second inclination angle for the first circular saw blade, relative to the first plane, about a second axis that extends through the first circular saw blade perpendicular to the first axis, based on the determined radius; and wherein the transmitter is further configured to send a control signal to the control unit to cause the control unit to rotate the first circular saw blade a second distance about the second axis, in a second direction, to the calculated second inclination angle and to rotate the second circular saw blade said second distance about a second corresponding axis that is perpendicular to the first corresponding axis, in a direction opposite to the second direction, so that the second circular saw blade is inclined towards the first circular saw blade.

11. A system for inclining at least one first circular saw blade when performing curve sawing of a block in a cutting direction, which system comprises:
   a measurement unit configured to measure the curvature of the block in the direction of cutting;
   a calculation unit according to claim 8; and
   a control unit configured to incline the first circular saw blade to the calculated first inclination angle.

12. The system according to claim 11, wherein the curve sawing is performed with the first circular saw blade and a second circular saw blade, which is offset from the first circular saw blade along the cutting direction, to thereby jointly create a common saw cut through the block, wherein the control unit is further configured to incline the second circular saw blade said first distance about a first corresponding axis, but in a direction opposite to the first direction, so that the second circular saw blade is inclined towards the first circular saw blade.

13. The system according to claim 11, wherein the calculation unit is further configured to calculate a second inclination angle for the first circular saw blade, relative to the first plane, about a second axis that extends through the first circular saw blade perpendicular to the first axis, based on the determined radius; and wherein the control unit is further configured to tilt the first circular saw blade a second distance about the second axis, in a second direction, to the calculated second inclination angle, and to tilt the second circular saw blade said second distance, but in a direction opposite to the second direction, about a second corresponding axis that extends through the second circular saw blade perpendicular to the first corresponding axis.

14. The system of claim 11, wherein the calculation unit is configured to calculate the first inclination angle based at least in part on a height of the block, a diameter of the first circular saw blade, or a vertical distance between the centre of the first circular saw blade and a saw base on which the block is placed.

15. The system of claim 14, wherein the calculation unit is configured to calculate the first inclination angle according to the following algorithm:

$\beta = \arctan(X_{average} - X_{top})/((d/2) - u)$, wherein:

$X_{average} = (X_{start} + X_{end})/2$;

$X_{top} = R(1 - \cos \alpha_{top})/\cos \alpha_{top}$;

$X_{end} = R(1 - \cos \alpha_{end})/\cos \alpha_{end}$;

$X_{start} = R(1 - \cos \alpha start)/\cos \alpha start$;

$\alpha_{top} = \arctan(-e/2)/R$;

$\alpha_{end} = \arctan(d/2 \sin \gamma end - (e/2))/R$;

$\alpha start = \arctan(d/2 \sin \gamma start - (e/2))/R$;

$\gamma start = \arccos(u/(d/2))$;

$\gamma_{end} = -\gamma start$;

$\gamma_{top} = 0$;

$R$ = the radius of curvature;

$e/2$ = a distance in the direction of cutting S between the centre of the first circular saw blade and a centre plane of the radius of curvature R;

$u$ = the vertical distance between the centre of the first circular saw blade and the saw base on which the block (100) is placed during the sawing; and $d$ = diameter of the first circular saw blade.

16. The system of claim 14, wherein the calculation unit is configured to calculate the first inclination angle by accessing a look-up table, wherein the look-up table includes a plurality of curve radii and corresponding inclination angles associated with the curve radii, and identifying the first inclination angle based on the determined radius of curvature.

17. The calculation unit of claim 8, wherein the processor is configured to calculate the first inclination angle based at least in part on a height of the block, a diameter of the first circular saw blade, or a vertical distance between the centre of the first circular saw blade and a saw base on which the block is placed.

18. The calculation unit of claim 17, wherein the processor is configured to calculate the first inclination angle according to the following algorithm:

$\beta = \arctan(X_{average} - X_{top})/((d/2) - u)$, wherein:

$X_{average} = (X_{start} + X_{end})/2$;

$X_{top} = R(1 - \cos \alpha_{top})/\cos \alpha_{top}$;

$X_{end} = R(1 - \cos \alpha_{end})/\cos \alpha_{end}$;

$X_{start} = R(1 - \cos \alpha_{start})/\cos \alpha_{start}$;

$\alpha_{top} = \arctan(-e/2)/R$;

$\alpha_{end} = \arctan(d/2 \sin \gamma_{end} - (e/2))/R$;

$\alpha_{start} = \arctan(d/2 \sin \gamma_{start} - (e/2))/R$;

$\gamma_{start} = \arccos(u/(d/2))$;

$\gamma_{end} = -\gamma_{start}$;

$\gamma_{top} = 0$;

$R$ = the radius of curvature;

$e/2$ = a distance in the direction of cutting S between the centre of the first circular saw blade and a centre plane of the radius of curvature R;

$u$ = the vertical distance between the centre of the first circular saw blade and the saw base on which the block (100) is placed during the sawing; and $d$ = diameter of the first circular saw blade.

19. The calculation unit of claim 17, wherein the processor is configured to calculate the first inclination angle by accessing a look-up table, wherein the look-up table includes a plurality of curve radii and corresponding inclination angles associated with the curve radii, and identifying the first inclination angle based on the determined radius of curvature.

* * * * *